Figure 1:
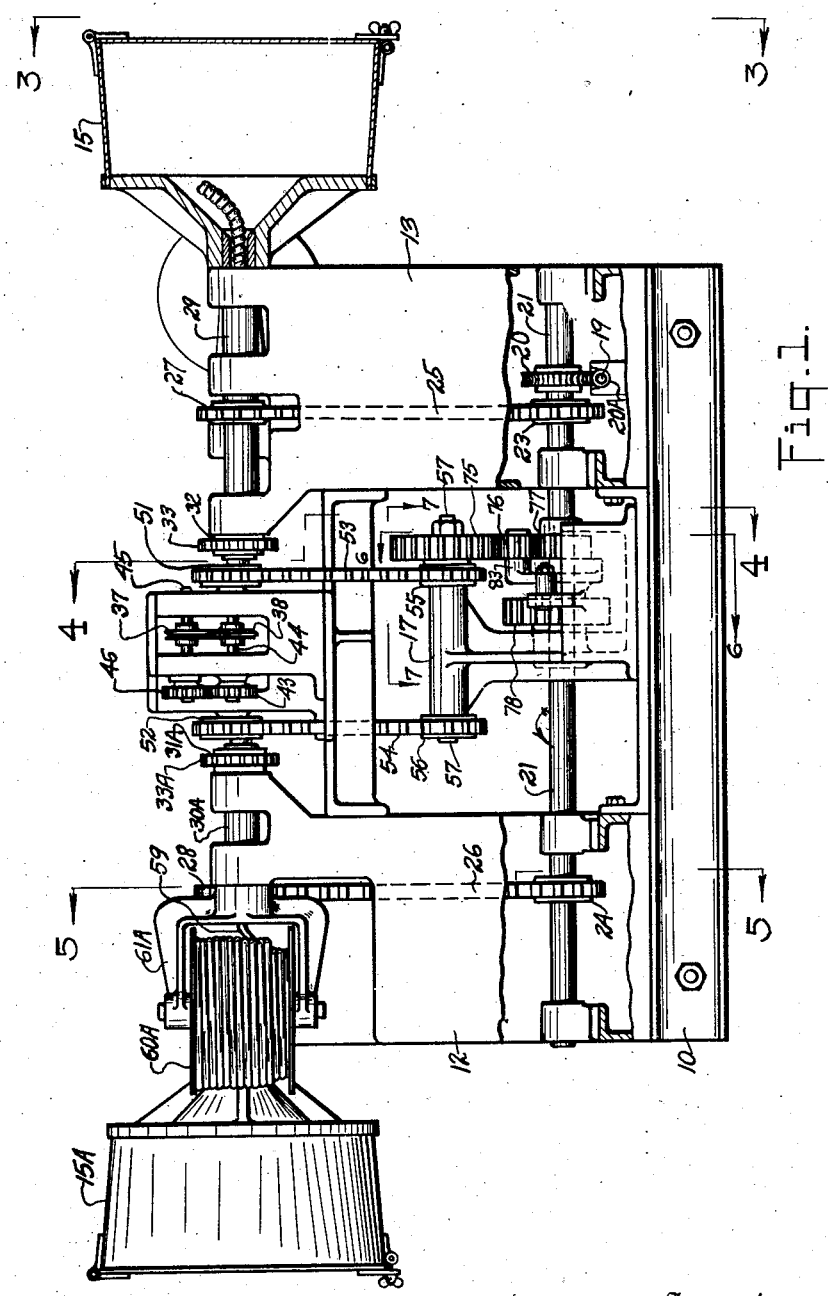

Feb. 22, 1927.

M. KATCHER 1,618,437

MACHINE FOR ARMORING CABLES

Filed Aug. 29, 1925   3 Sheets-Sheet 1

Inventor
Morris Katcher
By his Attorney
Emanuel Scheyer.

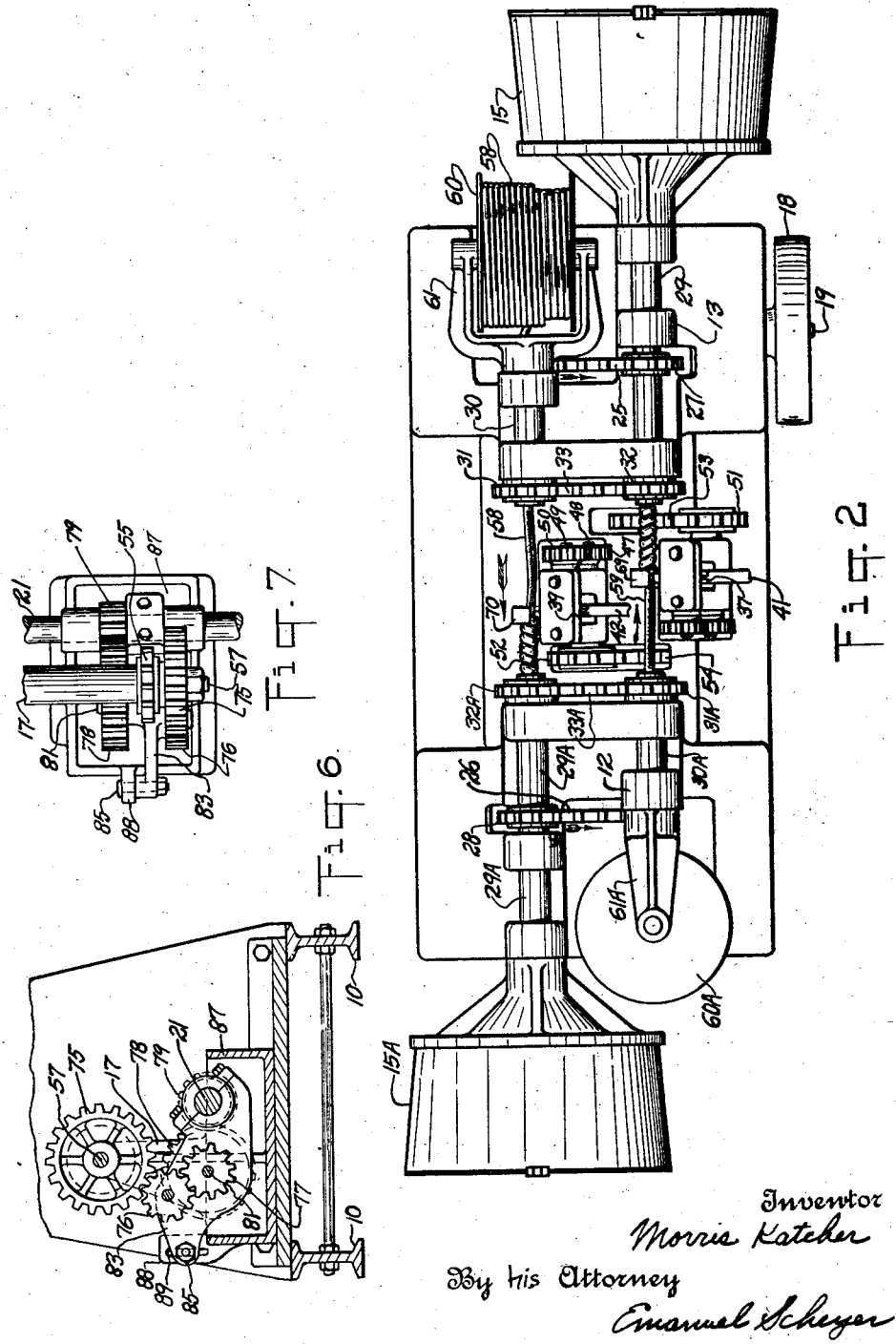

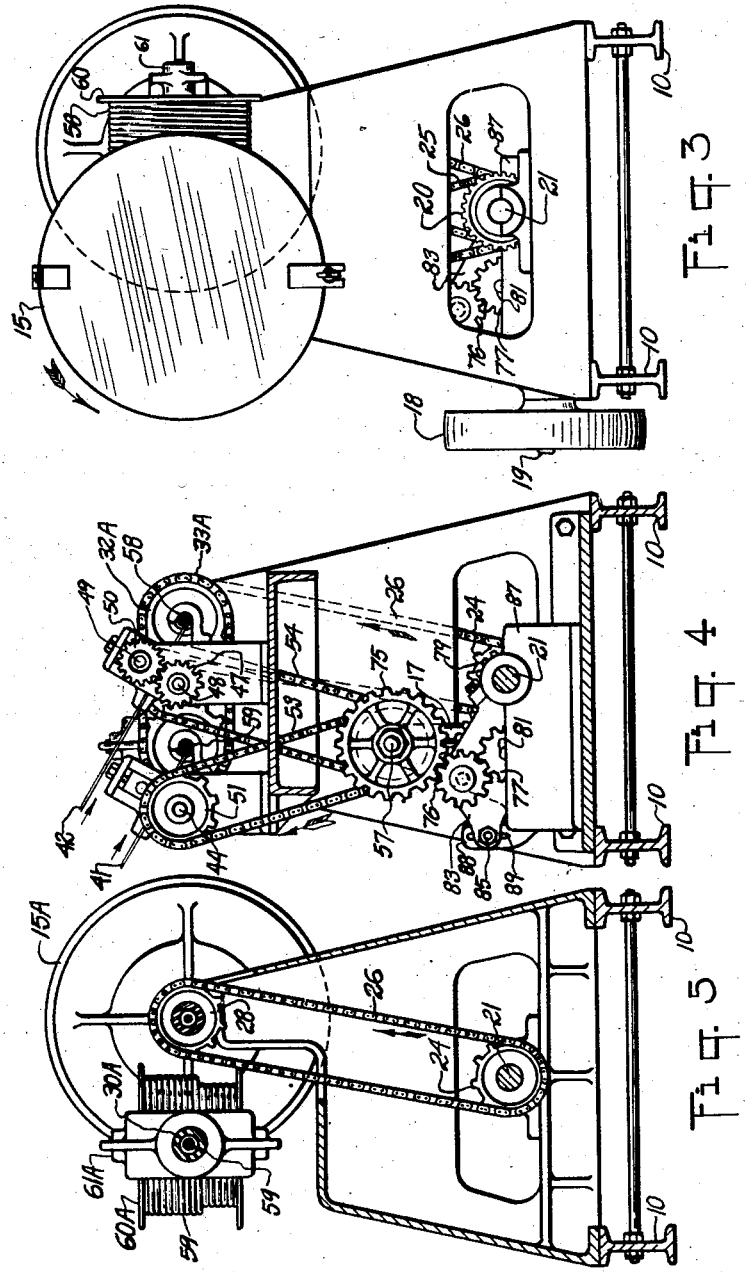

Patented Feb. 22, 1927.

1,618,437

UNITED STATES PATENT OFFICE.

MORRIS KATCHER, OF NEW YORK, N. Y.

MACHINE FOR ARMORING CABLES.

Application filed August 29, 1925. Serial No. 53,398.

The present invention relates to a machine for placing coils of metal strips or armor around electric cables or other similar objects for the purpose of inclosing the same and protecting them. It can also produce flexible metallic tubing without being wound around a cable.

The principal object of the invention is to provide a machine, which will simultaneously armor a plurality of cables, that is compact and simple in construction. Being able to armor a number of cables simultaneously by one machine, greatly increases the productive capacity of my device as compared to machines in general use at the present time which have capacity only for one cable.

A machine, according to my invention, can be operated from one side, thereby making it convenient for the operator.

In the present case, I have illustrated and described a machine in which two cables are armored simultaneously, but it will be evident to those skilled in the art, that more cables can be handled by following the principles of the construction disclosed.

In my preferred form, the armoring strips are fed into the machine, both from one side, and after passing between forming rolls they are forced against the grooved interior of dies which curl them into helices about the cables. As the helices are being generated at the dies, they continue to rotate and move off laterally, with respect to the dies, carrying along with them the length of cable about which they are curled. As the cable moves along with the generating helix, it is pulled from a reel which is suitably mounted to permit the cable to be rotated in unison with the rotation of the helix. The length of cable, which has already been armored, moves along laterally into a drum where it is laid up in a coil. There is a reel and drum for each cable which rotate with it, the drum for one cable rotating adjacent to the reel of the other.

Other objects and advantages will become apparent upon further study of the specification and drawings in which:

Figure 1 is a front elevation of the machine with two lower portions broken away to more clearly illustrate the construction; Figure 2 is a plan view of the machine; Figure 3 is an end elevation on line 3—3 of Figure 1; Figure 4 is a section on line 4—4 of Figure 1; Figure 5 is a section on line 5—5 of Figure 1; Figure 6 is a partial section along line 6—6 of Figure 1 and Figure 7 is a partial sectional plan along the line 7—7 of Figure 1.

The frame of the machine consists essentially of two I beams 10 suitably braced from each other forming a base upon which are supported two upright frames 12 and 13.

Rotatably mounted at the upper part of frame 12 is the hollow shaft $30^A$ which is in alignment with hollow shaft 29 rotatably mounted in the upper part of frame 13. Reel $60^A$, which carries bare cable 59 is rotatably mounted within yoke $61^A$ which is rigidly fixed to the end of shaft $30^A$. Cable 59 is led from reel $60^A$ through shaft $30^A$. into shaft 29. When armored, as will be explained hereafter, it is led with its armoring through shaft 29 and coiled in receiving drum 15 which is rigidly fixed to the end of shaft 29. In like manner, bare cable 58 wound upon reel 60 is led through hollow shaft 30 into hollow shaft $29^A$. Shaft 30 is rotatably mounted in the upper part of frame 13 and in alignment with shaft $29^A$ rotatably mounted in the upper part of frame 12. Yoke 61 rigidly fixed to the end of shaft 30, rotatably supports reel 60.

The mechanism for rotating shafts 29, $29^A$, 30 and $30^A$ is as follows: The machine is driven by a belt (not shown) which engages pulley 18 fixed to shaft 19 suitably supported in bearings in the lower portion of the machine. Fixed to shaft 19 is a worm $20^A$ which engages with worm-wheel 20 fixed to shaft 21 running longitudinally of the machine. Shaft 21 carries fixed to it sprocket wheels 23 and 24 meshing respectively with chains 25 and 26. Chain 25 engages sprocket wheel 27 fixed to shaft 29, causing thereby the rotation of receiving drum 15. In like manner chain 26 engages sprocket wheel 28 fixed to shaft $29^A$ causing the rotation of receiving drum $15^A$. Reels 60 and $60^A$ are rotated at a rate corresponding to the rate that the strips of metal 41 and 42 are being formed into helices about cables 58 and 59. The rotation being considered is that about shafts 30 and $30^A$ as axes, to which it will be remembered forks 61 and $61^A$ are fixed respectively. The rotation of shaft 30 is effected by chain 33 which drives sprodket wheel 31 fixed to said shaft. Chain 33 is in turn driven by sprocket wheel 32 fixed to shaft 29. In like manner shaft $30^A$ is rotated by chain $33^A$ which drives sprocket wheel 31^A fixed to said shaft. Chain 33^A is in turn driven by sprocket wheel 32^A fixed to shaft 29^A.

The mechanism for feeding in, forming and bending the metal strips 41 and 42 into helices about cables 58 and 59 will now be described. Metal strips 41 and 42 are led into the machine from an outside source (not shown). As they enter the machine they pass between feeding and forming rolls, a pair of which, for handling strip 42, are seen in Figure 1, showing an upper roll 37 and a lower roll 38. A similar pair of rolls are provided for strip 42, the upper one of which 39 can be seen in Figure 2. Upper roll 37 can also be seen in Figure 2. Each pair of rolls is so formed that the metal strip in passing between them is pressed into suitable shape for interlocking when bent into a helix. After passing through rolls 37 and 38, metal strip 41 is fed against die 69 which has a suitable groove, as is well known in the art, for deflecting the strip laterally in the form of a helix. In a similar manner strip 42 after being passed between its forming rolls is fed against die 70 and deflected laterally in the form of a helix.

The mechanism for rotating the feeding rolls will now be explained. As the rate of rotation of the feeding rolls must be varied to suit different thicknesses of cable and metal strips, change gear mechanism is provided between shaft 21 and the feeding rolls. With this end in view, it is provided that gear 75, fixedly mounted on shaft 57, is replaceable with gears of various sizes. Shaft 57 (best seen in Figures 1 and 6) is rotatably mounted in bracket 17. Fixed to shaft 57 are sprocket wheels 55 and 56 meshing respectively with which are chains 53 and 54. Chain 53 drives sprocket wheel 51, while chain 54 drives sprocket wheel 52. Sprocket wheel 51 is fixed to shaft 44 which carries fixed to it lower feeding roll 38. The other end of shaft 44 carries gear 43 fixed upon it. Gear 43 meshes with gear 46 fixedly mounted upon shaft 45, which carries the upper feeding roll 37. In like manner sprocket wheel 52 is fixedly mounted upon shaft 48 (Figure 2) near one end. Shaft 48 carries gear 47 (Figures 2 and 4) fixedly mounted at its other end. The lower feeding roll (not shown) which cooperates with the upper feeding roll 39, is also fixedly mounted on shaft 48. Gear 47 meshes with gear 50 fixedly mounted upon shaft 49 carrying the upper feeding roll 39. To provide for the substitution of different size gears for gear 75, gear 76 which meshes with gear 75 and gear 77 which meshes with gear 76 are rotatably mounted on a link 83 which in turn is loosely mounted on shaft 21. Gear 77 is mounted on one end of pin 81 which passes through link 83, the other end of pin 81 carrying gear 78 (Figures 1, 4, 6 and 7). Gear 78 meshes with gear 79 fixed to shaft 21. Link 83 can be adjustably set in various positions about shaft 21 by means of bolt 85 which is adapted to slide in slot 89 formed in fixed bracket 88. The change gear mechanism just described is adapted to dip into the lubricating chamber 87 from which bracket 88 extends.

In operation, the cables are led from their reels 60 and 60^A past the dies 69 and 70 and into the hollow shafts 29 and 29^A to drums 15 and 15^A. Through the connections described shafts 30 and 30^A together with reels 60 and 60^A are rotated from pulley 18 and shaft 21. Likewise the pairs of feed rolls 37 and 38 together with 39 and its mate are rotated from shaft 21. Simultaneously with the rotation of reels 60 and 60^A and cables 58 and 59, metal strips 41 and 42 are fed between the pairs of feeding rolls against dies 69 and 70 and are formed into helices about the cables. The helix formed by die 69, passes off to the right (Figure 2) as it is generated, carrying along with it cable 59 through shaft 29 and into the rotating drum 15 where it is laid up into a coil. In a similar manner, the helix formed by die 70 passes to the left with cable 58 and is laid up in drum 15^A.

In using the machine for forming flexible hollow tubing only, the cables are omitted, otherwise the operation of the machine is similar to that just described.

I claim:

1. In a coiling machine of the character described, the combination of a plurality of sets of forming wheels adapted to rotate in planes parallel to each other whereby a plurality of metallic strips move parallel to each other after having passed between the wheels of a set, there being a strip corresponding to each set, a plurality of dies, a die corresponding to each set, adapted to receive and coil the metallic strips into flexible tubes after same have left the forming wheels, said dies being adapted to feed off the coils as generated in parallel and opposite directions.

2. In a coiling machine of the character described, the combination of a pair of dies and mechanism for feeding metallic strips into the dies, said dies being suitably formed to coil said strips into flexible tubes, the outlets of said dies being suitably positioned to feed off the tubes as generated in parallel and opposite directions.

3. In a cable armoring machine, the combination of a pair of rotatable reels for supplying a pair of cables, means for turning said reels about an axis perpendicular to their axes of rotation whereby the cables are revolved as they are fed, a pair of dies adapted to receive and coil a metallic strip about each cable, said dies being adapted to feed off the coils as generated in opposite directions, the generating coils pulling off the cables from the reels, said reels being located on opposite sides of the dies.

4. A cable armoring machine as claimed in claim 3 having rotatable means for receiving the cables when armored, the means for receiving the armored cable from one die being substantially adjacent the reel for supplying cable to the other die.

5. In a cable armoring machine, the combination of a pair of means for supplying a pair of cables, mechanism for rotating said means whereby the cables are revolved as they are supplied, another pair of means for receiving the cables from the supplying means and a pair of dies adapted to receive and coil a metallic strip about each cable, said dies being adapted to feed off the coils as generated in opposite directions, the generating coils pulling off the cables from the supplying means, the supplying means for one die being substantially alongside of the receiving means for the other die.

6. In a coiling machine of the character described, the combination of a pair of dies and mechanism for feeding metallic strips into the dies, said dies being suitably formed to coil said strips into flexible tubes and to discharge the tubes as generated in opposite directions, and means for receiving the tubes when generated, one receiving means being located on one side of the dies and the other receiving means being located on the opposite side of the other die.

7. In a cable armoring machine, the combination of a pair of rotatable reels for supplying a pair of cables, a hollow shaft for turning each of said reels about an axis perpendicular to its axis of rotation whereby the cables are revolved as they are fed, said cables being fed through said hollow shafts, a pair of dies adapted to receive and coil a metallic strip about each cable, said dies being adapted to feed off the coils as generated in opposite directions, the generating coils pulling off the cables from the reels, a drum for each cable adapted to receive and coil its corresponding cable when armored, a hollow shaft adapted to rotate each drum, the armored cables adapted to pass through said drum shafts to the drums, said drum shafts each being in alignment with a reel shaft, one reel shaft and its corresponding aligned drum shaft being parallel to the other reel shaft and its corresponding drum shaft, the drum shaft for one cable lying alongside of the reel shaft of the other cable.

8. In a cable armoring machine, a pair of oppositely disposed devices for supplying a pair of cables, means for armoring said cables adapted to cause said cables to be pulled from said supplying devices in opposite directions and means for receiving the cables when armored located on opposite sides of the armoring means.

9. In a cable armoring machine, a pair of devices for supplying a pair of cables, said devices being adapted to cause rotation of said cables as they are supplied, a pair of dies each adapted to receive and coil a metallic strip about a cable, two sets of feeding mechanisms adapted to feed the strips into the dies, and means adapted to be driven from a source of power adapted to drive simultaneously both sets of feeding mechanisms and the devices for supplying the cables, and change gear mechanism common to both sets of feeding mechanisms for varying the relative rotation of the cables to the speed of feeding of the strips.

10. In a cable armoring machine, a pair of devices for supplying a pair of cables, said devices being adapted to cause rotation of said cables as they are supplied, a pair of dies each adapted to receive and coil a metallic strip about a cable, two sets of feeding mechanisms adapted to feed the strips into the dies, said cable supplying devices being geared to each other and to the feeding mechanisms.

11. A cable armoring machine as claimed in claim 8, in which the device for supplying one cable is geared to the means for receiving the other cable.

12. In a coiling machine of the character described, the combination of a pair of dies and mechanism for feeding metallic strips into the dies, each die having a coiling groove for coiling said strips into flexible tubes, the entrance to the groove being on the same side of the die for each die, whereby the metallic strips are received by both dies on the same side, and the discharge ends of said grooves being suitably directed to feed off the tubes as generated in parallel spaced relation.

MORRIS KATCHER.